(12) United States Patent
Nakash et al.

(10) Patent No.: US 9,197,570 B2
(45) Date of Patent: Nov. 24, 2015

(54) CONGESTION CONTROL IN PACKET SWITCHES

(71) Applicant: ECI Telecom Ltd., Petach Tikva (IL)

(72) Inventors: Shell Nakash, Kfar Saba (IL); Gideon Agmon, Kfar Saba (IL)

(73) Assignee: ECI TELECOM LTD., Petach Tikva (IL)

( * ) Notice: Subject to any disclaimer, the term of this patent is extended or adjusted under 35 U.S.C. 154(b) by 252 days.

(21) Appl. No.: 13/869,514

(22) Filed: Apr. 24, 2013

(65) Prior Publication Data

US 2013/0279340 A1 Oct. 24, 2013

(30) Foreign Application Priority Data

Apr. 24, 2012 (IL) .......................................... 219391

(51) Int. Cl.
*H04L 12/851* (2013.01)
*H04L 12/801* (2013.01)

(52) U.S. Cl.
CPC ............ *H04L 47/2483* (2013.01); *H04L 47/24* (2013.01); *H04L 47/29* (2013.01)

(58) Field of Classification Search
CPC ..... H04L 12/70; H04L 47/24; H04L 47/2483; H04L 47/29
See application file for complete search history.

(56) References Cited

U.S. PATENT DOCUMENTS

| 6,714,517 | B1 | 3/2004 | Fawaz et al. |
| 7,133,399 | B1 | 11/2006 | Brewer |
| 2001/0026551 | A1 | 10/2001 | Horlin |
| 2002/0075883 | A1 | 6/2002 | Dell |
| 2008/0159149 | A1* | 7/2008 | Okuno .......................... 370/237 |

OTHER PUBLICATIONS

J. Heinanen et al., "A Two Rate Three Color Marker", (Sep. 1999), p. 1-5, RFC 2698.

* cited by examiner

*Primary Examiner* — Jianye Wu
(74) *Attorney, Agent, or Firm* — Browdy and Neimark, PLLC (57) ABSTRACT

A method is provided for managing congestion of traffic in a packet switch, which comprises the steps of: providing more than two different congestion levels at the switch for handling traffic associated with at least two different priorities, one being a low priority traffic and another being a high priority traffic; for each traffic flow having a specific destination and priority, determining a current congestion level that matches a congestion control level which is selected from among the more than two congestion control levels, and associating a different set of operations for handling each respective traffic flow, depending on its priority and its current congestion level, and for each traffic flow, performing operations that match the respective associated set of operations, and wherein a rate at which these operations are performed for each respective traffic flow increases when a higher congestion level occurs at that respective traffic flow.

7 Claims, 9 Drawing Sheets

| ACTION | VoQ SHAPER | | | |
| --- | --- | --- | --- | --- |
| | CIR | PIR | CBS | PBS |
| START | CIR | PORT RATE | NORMAL | CBS |
| SLOW | CIR | CIR | NORMAL | CBS |
| SLOW SHARP | CIR | CIR | MIN | CBS |
| PAUSE | 0 | 0 | 0 | 0 |

| ACTION | VoQ SHAPER | | | |
|---|---|---|---|---|
| | CIR | PIR | CBS | PBS |
| START | CIR | CIR | NORMAL | CBS |
| SLOW | CIR | CIR | REDUCED | CBS |
| SLOW SHARP | CIR | CIR | Min | CBS |

CONGESTION CONTROL IN PACKET SWITCHES

CROSS-REFERENCE TO RELATED APPLICATIONS

This application claims priority of Israel Patent Application No. 219391, filed Apr. 24, 2012, the disclosure of which is incorporated by reference herein in its entirety.

TECHNICAL FIELD

The present invention relates to the field of packet-switched networks and more particularly, to congestion control for packet switches.

BACKGROUND

Packet Switch

Packet switch equipment (hereinafter, also switches) transfers packets from their input ports to specified output ports. With distributed switching arrangement, a switch architecture would include line cards that host the input/output (I/O) ports, and a switch fabric, responsible for transporting packets from ingress line cards (hereinafter, sources) to egress line cards (hereinafter, destinations, dests). A line card is connected to the switch fabric using fabric port(s).

A cost-effective switch fabric could be realized using an off-the-shelf packet processor capable of switching packets among its fabric ports and enhanced with congestion control mechanisms to throttle the sources, in order to prevent congestion at the switch fabric.

Figure 1:
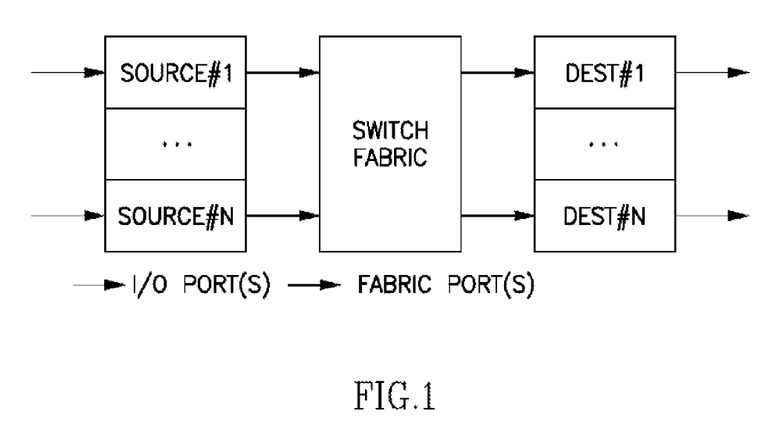
FIG. 1 (prior art) is a schematic illustration of a distributed architecture of a packet switch.

FIG. 1 illustrates a basic architecture of a distributed switch with N sources. Each line card is subdivided to an ingress block (source) and an egress block (dest). The source block receives packets from I/O ports and sends them to the switch fabric via fabric ports. The packets would typically be appended with a header that comprises forwarding info (e.g., to which fabric port should the switch fabric send the respective packet), as well as QoS info (e.g., packet priority). The dest block receives packets on fabric ports and sends them to I/O ports. For the sake of simplicity, it shall be assumed that each source is connected to the switch fabric via a single fabric port.

QoS & TM

Advanced switches support quality of service (QoS) for service differentiation. A service could be regarded as a logical flow from one service endpoint to another. The flow could be carried by a traffic engineered MPLS tunnel for QoS support while it is propagated across a provider network.

QoS support requires traffic management (TM) mechanisms, such as buffering for burst absorption, shaping for rate (capacity, bandwidth) limiting and classification (committed/excess traffic), and scheduling for prioritization and bandwidth (BW) fairness. The QoS challenge of a distributed switch is to provide end-to-end (E2E) BW guarantees per service, from the source I/O port to the destination I/O port.

For the sake of simplicity, it shall be assumed that a switch supports two priority grades, a high (H) priority and a low (L) priority. H priority traffic expects improved delay performance (e.g. minimal delay), while L priority traffic can tolerate higher delays. However, traffic of both priorities should be provided with E2E BW guarantees.

The following TM mechanisms may be considered in general:

A virtual output queue (VoQ) holds traffic in memory buffers. A dedicated VoQ per destination avoids the so-called head of line (HoL) blocking that would otherwise occur when one destination is congested while another is not. The size of the VoQ provides an indication to the number of packets that can be stored thereat. A VoQ whose traffic is "bursty" by nature, would typically require larger size to effectively absorb traffic bursts. The VoQ buffering is split to a guaranteed portion, typically set according to the Committed information rate ("CIR"), and an excess portion, typically set according to the excess information rate ("EIR").

A shaper limits the traffic rate that goes to same Dest-Prio (i.e., same destination with the same priority) The shaper may be for example of a dual-rate type per IETF RFC 2698, which provides two rates: (1) Committed information rate (CIR) is the guaranteed rate per Dest-Prio. Note that the CIR must not be oversubscribed, i.e., the sum of CIR of all VoQs must not exceed the outgoing port rate; (2) Peak information rate ("PIR") is the maximum allowed rate per a Dest-Prio. Note that when PIR is larger than CIR, only the rate CIR is guaranteed, while PIR-CIR (a.k.a., excess information rate, EIR) is not, and would be provided only if there are free resources available. For example, when some VoQs on a port do not fully utilize their CIR, the unused BW (a.k.a., excess BW) could be allocated to other VoQs on that port.

A shaper is further configured with two additional parameters: (1) Committed burst size (CBS) is the guaranteed burstiness (2) Peak burst rate (PBS) is the maximum burstiness. A VoQ whose traffic is "bursty" by nature would require larger CBS and PBS values to effectively pass its traffic across the switch fabric.

A shaper may be implemented by using two token buckets, wherein a CIR (PIR) bucket accumulates "tokens" or bits at a rate of CIR (PIR), up to CBS (PBS), respectively.

A scheduler is used to schedule traffic arriving at multiple VoQs, with the following precedence: (1) VoQs with higher priority—which are referred to as "strict priority for H over L priority"; (2) VoQs within its CIR limits, and configurable according to a so-called committed weighting among multiple such VoQs; (3) VoQs within its PIR limits, and configurable according to a so-called excess weighting among multiple such VoQs.

Source TM

Figure 2:
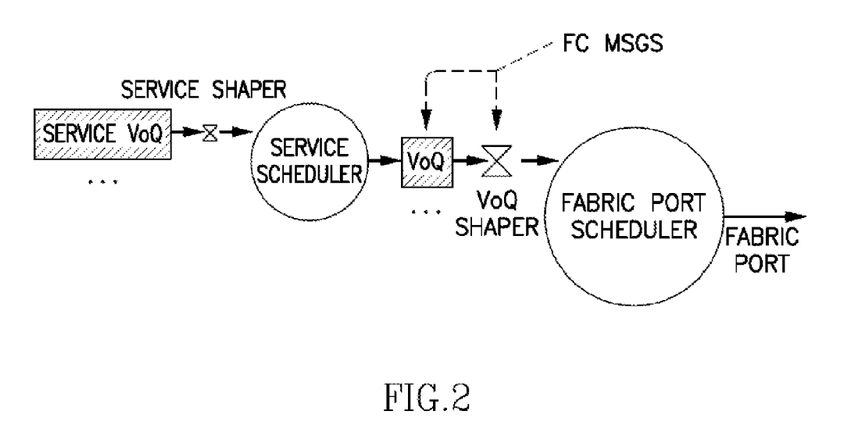
FIG. 2 is a schematic diagram illustrating traffic management at a source (e.g., at an ingress line card)

FIG. 2 illustrates a reference TM scheme for an outgoing fabric port at a source. The source maintains a VoQ and a shaper per egress fabric port per priority. The shapers are connected to the fabric port scheduler. A VoQ can connect multiple Service VoQs. Each Service VoQ undergoes optional shaping at the Service Shaper, and is then being scheduled by the Service Scheduler into the VoQ for fairness and prioritization.

The VoQ and the shaper are adaptive, so that their configuration may be tuned based on congestion report messages (hereafter flow control messages, FC messages) that are generated by the switch fabric and broadcasted to all sources. An FC message would typically contain an indication/command for each egress fabric VoQ. The FC message rate may be limited to a maximum value, so as to avoid these messages from consuming too much of the system resources. On the other hand, a minimum FC message rate may be maintained, even if there are no congestion state changes.

The fabric port scheduler handles traffic as described at the QoS & TM section. That is, it first schedules H VoQs and then L VoQs. Among VoQs of same priority, it first schedules (with configurable weight per VoQ) those that are within their CIR limit, and then those that are within their PIR limits (with configurable weight per VoQ).

Switch Fabric TM

Figure 3:
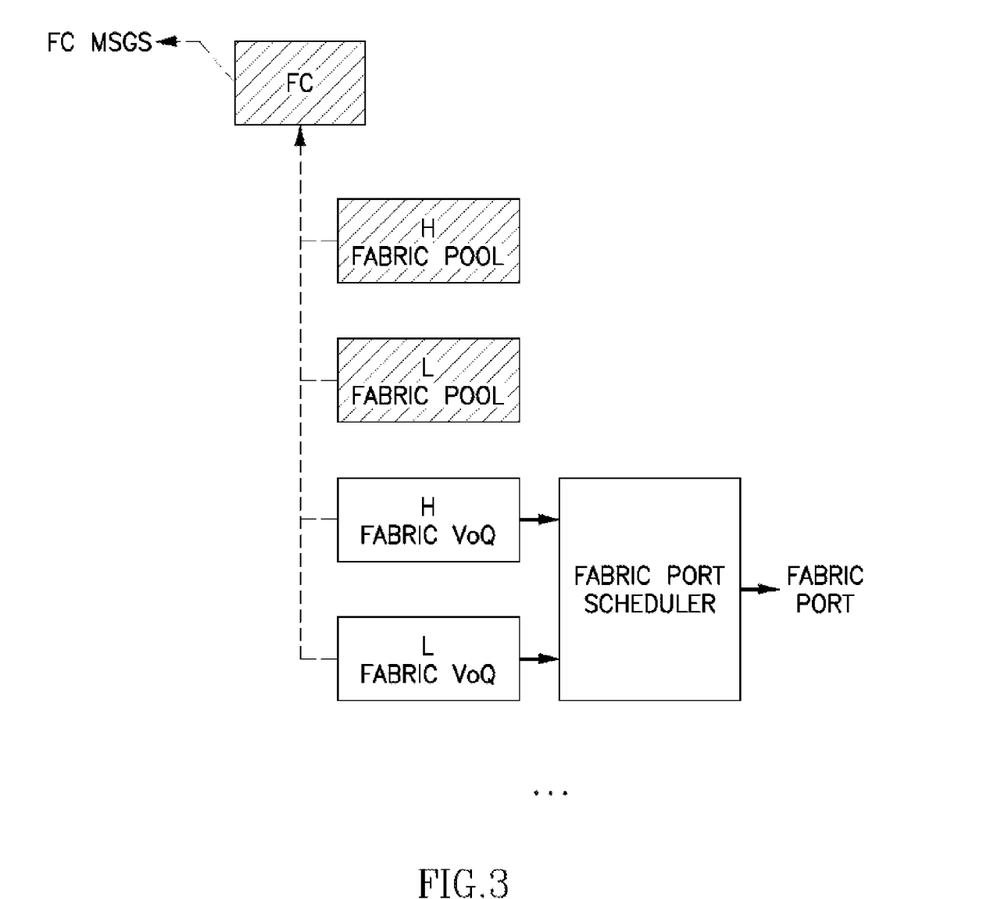
FIG. 3 is a schematic diagram illustrating traffic management at the Switching Fabric, in particular at a specific egress port.

FIG. 3 illustrates a reference TM scheme for the switch fabric. The switch fabric maintains two fabric VoQs per an outgoing fabric port. One for H priority (H fabric VoQ) and the other for L priority (L fabric VoQ). The two fabric VoQs are connected to the fabric port scheduler, which schedules the H fabric VoQ with strict priority (SP) over the L fabric VoQ. Namely, the L fabric VoQ is allowed to transmit only when no packets queued at the H fabric VoQ, thus providing smaller delay to H VoQs, as is usually desired, though other scheduling schemes could also be used.

The switch fabric has also two shared buffer pools (H and L fabric pools, for H and L priority, respectively). These pools are maintained per switch fabric, rather than per fabric port. The switch fabric would first try to queue a packet at the appropriate fabric VoQ, which has pre-assigned dedicated (guaranteed) memory buffers. If there is not enough space there, it would try to queue the packet at the pool, and if there is not enough space there either, it would discard the packet.

The FC block monitors the packet buffer consumption of the fabric VoQs and pools, and upon congestion, as indicated by crossing the buffering threshold, would generate and broadcast FC messages to the ingress line cards.

It should be understood that switch fabrics in general and particularly those realized by using an off-the-shelf packet switches, rely on built-in (internal) packet memories, in order to achieve high capacity switching. In order to reduce cost and space, these memories are typically extremely small, and accordingly so are the fabric VoQs and pools. As a matter of fact, the switch fabric memory could be three orders of magnitude smaller than the packet memory maintained by a single line card. This requires a highly efficient and accurate congestion control algorithm.

There are a number of known prior art solutions which try to solve similar problems of traffic management at packet switches.

US 2001026551 describes an arrangement and a method for controlling a flow of signals. The flow includes a number of information packets in a communications network, e.g. an ATM-network. The arrangement includes a device for separating the signals in the first traffic signals from second traffic signals. The first traffic signals are signals that have a higher proportion of guaranteed resources, i.e. bandwidth, than the second traffic signals. The first traffic signals are also given a lower priority than the second traffic signals. The first and second traffic signals are handled separately. The feedback arrangement in that solution is so-called ABR arrangement which is rate based and assumes loss of packets.

US 2002075883 describes a switch fabric for routing data, which has a switching stage configured between an input stage and an output stage. The input stage forwards the received data to the switching stage, which routes the data to the output stage, which transmits the data towards destinations. In one aspect, at least one input port can be programmably configured to store data in two or more input routing queues that are associated with a single output port, and at least one output port can be programmably configured to receive data from two or more output routing queues that are associated with a single input port. In another aspect, the output stage transmits status information about the output stage to the input stage, which uses the status information to generate bids to request connections through the switching stage. In yet another aspect, the switching stage transmits a grant/rejection signal to the input stage identifying (1) whether each bid is accepted or rejected and, if rejected, (2) a reason for rejecting the bid, and the input stage determines how to react to a rejected bid based on the reason the bid was rejected.

The above-described solution is quite complex since it requires generation of bids, requesting connections and negotiation of grants/rejections for putting data via the switch.

U.S. Pat. No. 7,133,399 describes a centralized arbitration mechanism wherein a router switch fabric is configured in a consistent fashion. Remotely distributed packet forwarding modules determine which data chunks are ready to go through the optical switch and communicate this information to a central arbiter. Each packet forwarding module has an ingress ASIC containing packet headers in roughly four thousand virtual output queues. Algorithms choose at most two chunk requests per chunk period to be sent to the arbiter, which queues up to roughly 24 requests per output port. Requests are sent through a Banyan network, which models the switch fabric and scales on the order of N log N, where N is the number of router output ports. Therefore a crossbar switch function can be modeled up to the 320 output ports physically in the system, and yet have the central arbiter scale with the number of ports in a much less demanding way. An algorithm grants at most two requests per port in each chunk period and returns the grants to the ingress ASIC. Also for each chunk period the central arbiter communicates the corresponding switch configuration control information to the switch fabric. Still, the above solution requires the arbitration mechanism, the central arbiter, and sending requests to the arbiter for obtaining grants.

U.S. Pat. No. 6,714,517 discloses a packet-switched communication network which provides a guaranteed minimum bandwidth between pairs of Packet Switches, by defining Service Level Agreements (SLAs). An SLA is defined by at least a source identifier, a destination identifier and a minimum data rate, although other information may also be used. Upon arrival at certain networked nodes, packets are classified according to an SLA by reading the source and destination addresses in the packet. Once classified, the packets are placed in a queue and scheduled for transmission. A scheduler ensures that packets are transmitted at the minimum defined data rate for the SLA. The scheduler may use a statistical multiplexing method, such as deficit round robin, or deficit golden ratio. The deficit golden ratio method assures a minimum rate to packets for a particular SLA, but minimizes jitter and delay. Further, the solution implements congestion control that does not require nodes to be entirely turned off in congested conditions. However, the solution is not intended for a switch fabric assembly, as it handles queue congestion caused by only a single source sending to that queue, while a switch fabric is generally required to handle congestion caused by multiple sources.

In summary, neither of the above-mentioned prior art solutions achieves the objectives of an efficient and accurate congestion control algorithm as formulated below, simultaneously and cost effectively.

OBJECT AND SUMMARY OF THE INVENTION

The disclosure may be summarized by referring to the appended claims.

Objectives of a desired, highly efficient and accurate congestion control algorithm are summarized below:
(1) Lossless Operation: The switch fabric should not discard packets. A packet discard would occur when both the fabric VoQ and pool buffers are exhausted. The goal of congestion control is to prevent the switch fabric from reaching this point. If packets' discards do occur, they should take place at the respective sources, which would hold much more packets (compared with the switch fabric) before they would start discarding them.

(2) Full Utilization: The switch fabric should fully utilize its capacity. A fabric VoQ would under-run when it becomes empty. The goal of congestion control is to prevent the fabric VoQs from reaching this point. As long as the ingress line cards (sources) have traffic to send to an egress fabric port, the latter should be kept busy while transmitting traffic.

(3) QoS: The switch should be able to support QoS per service. This includes guaranteed BW per service, and also small delays (especially for H traffic).

(4) Simplicity: It should be possible to realize the solution with relatively simple switch fabrics, and particularly with off-the-shelf packet processors. In particular, a centralized arbiter at the switch fabric that accepts dynamic information from sources and generates control commands per source (such as disclosed by U.S. Pat. No. 7,133,399 mentioned above) is not allowed, being complicated and costly.

The proposed method uses an incremental approach, in the sense that the actions taken become more intense as the congestion severity increases.

For example:

For Low priority traffic: (1) Under no congestion—no steps are taken. All sources can send unlimited traffic, i.e., continuously at full fabric port speed (2) Under minor congestion—the sources may keep sending committed traffic (CIR) but stop sending any excess traffic (3) Under moderate congestion—the sources reduce the committed burstiness to minimum (4) Under severe congestion—the sources stop sending L priority traffic For High priority traffic: (1) Under no congestion—no steps are taken. All sources may send unlimited traffic (2) Under minor congestion—the sources may keep sending committed traffic (CIR) but reduce the committed burstiness (3) Under moderate congestion—the sources reduce the committed burstiness to minimum.

In other words, according to an embodiment of the invention there is provided a method for managing congestion of traffic in a packet switch, wherein the comprising the steps of:

providing more than two different congestion levels at the switch for handling traffic associated with at least two different priorities, one being a Low priority traffic "L" and another being a High priority traffic "H";

for each traffic flow having a specific Destination and Priority (Dest-Prio), determining a current congestion level that matches a congestion control level selected from among said more than two a congestion control levels, and associating a different set of operations for handling each respective traffic flow, depending on its priority and its current congestion level, and for each traffic flow, performing operations that match the respective associated set of operations, and wherein a rate at which the operations are performed for each respective traffic flow increases when a higher congestion level is associated with that respective traffic flow (e.g. utilizing an incremental approach for each of the traffic flows, wherein the operations in the sets of operations become more intense as the congestion severity increases).

The Dest-Prio traffic flow can be understood as a traffic flow of a specific priority out of the at least two different priorities, and provisioned between one or more specific ingress ports (sources) and a specific egress port of the packet switch.

According to another embodiment, the more than two different congestion levels comprising:

level 1, "Not congested", wherein a fabric VoQ is not congested and irrespective whether a fabric pool is congested or not, wherein said level 1 is associated with an FC CMD "START" to enable unlimited rate of transmission from a source VoQ;

level 2, "Slightly congested", wherein the fabric VoQ is congested, whereas the fabric pool is not congested, wherein said level 2 is associated with an FC CMD "SLOW" for reducing rate of transmission from the source VoQ;

level 3, "Moderately congested", wherein the fabric VoQ is congested and the fabric pool is moderately congested, wherein said level 3 is associated with an FC CMD "SLOW SHARP" for sharply reducing rate of transmission from the source VoQ;

level 4, "Severely congested", wherein the fabric VoQ is congested and the fabric pool is severely congested, wherein said level 4 is associated with an FC CMD "PAUSE" to stop transmissions from the source VoQ, and wherein said levels of traffic flows congestions are used in generating respective Flow Control commands (FC CMDs) for regulating one or more traffic flows at a source of each given traffic flow.

According to yet another embodiment, the method further comprises providing each virtual queue HVoQ/LVoQ located at each specific Source with a corresponding HShaper/LShaper and blocks for scheduling and buffering, controlled by Source Flow Control (SFC) for regulating traffic transmission rate from virtual queues at a specific source.

It goes without saying that the condition of a buffer and of a queue (VoQ) may be determined by using one or more predetermined thresholds. Any such threshold is usually reflected by a length of the buffer/queue occupied by packets. For example three levels of congestion may be used in order to characterize the condition of the SF buffers (pools)—no congestion, moderate congestion and severe congestion, which may be identified for example by measuring contents of the buffers and determining whether one or more predetermined thresholds of filling the buffer by packets is/are exceeded.

The Flow Control commands (FC CMDs) "start", "slow", "slow sharp" and "pause" actually constitute four diagnostic decisions which are made by the proposed Flow Control mechanism (comprising the FFC at the fabric and the SFC at a specific ingress port/source), and a suitable flow control command is used which matches the respective level of congestion mentioned above. The method provides, for each FC CMD and a specific priority (from among the at least two different priorities), a set of traffic control operations (related to—i.e. for controlling—a corresponding source shaper, scheduling parameters and buffering). The sets of operations are different for different combinations of an FC CMD and a priority.

Preferably, the method further comprises providing for each combination of a specific command from among the FC CMDs and a specific priority from the at least two different priorities, a set of traffic control operations, for controlling a corresponding source shaper, scheduling parameters and buffering, wherein the traffic control operations rely on a value of at least one parameter from the group that comprises:

Committed information rate CIR, a guaranteed rate per Dest-Prio;

Peak information rate PIR, a maximum allowed rate per Dest-Prio;

Committed burst size CBS, a guaranteed burstiness; and

Peak burst rate PBS, a maximum allowed burstiness.

In addition, the method may further comprise a step of selecting (e.g. pre-configuring) the above specified parameters.

Detailed description of these traffic control operations to be performed at specific levels of congestion for high priority traffic; for low priority traffic will be given with reference to FIGS. 6 and 7, and are further under the section "Detailed Description". The method comprises rules for differentially regulating traffic rate at the output of specific virtual queues VoQs at the sources, per Dest-Prio.

According to still another embodiment, the set of the traffic control operations comprises performing, upon receiving an FC CMD, the following operations at a source H VoQ shaper:
- if the FC CMD is "START"—tuning the VoQ shaper so that CIR value is set to be equal to a preconfigured CIR value, setting a PIR value to be equal to the CIR value, setting CBS value to a preconfigured committed value and setting PBS value to be equal to the CBS value1;
- if the FC CMD is "SLOW"—tuning the VoQ shaper so that CIR value is set to be equal to a preconfigured CIR value, setting a PIR value to be equal to the CIR value, setting CBS value to be equal to a preconfigured reduced value, and setting a PBS value to be equal to the CBS value.
- if the FC CMD is "SLOW SHARP"—tuning the VoQ shaper so that CIR value is set to a preconfigured CIR value, setting a PIR value to be equal to the CIR value, setting a CBS value to be equal to a preconfigured minimum value, and setting a PBS value to be equal to the CBS value.

According to yet another embodiment, the set of the traffic control operations comprises performing, upon receiving an FC CMD, the following operations at a source L VoQ shaper:
if the FC CMD is "START":
  Setting a CIR value to be equal to a preconfigured value;
  Setting a PIR value to be equal to the fabric port rate;
  Setting a CBS value to be equal to a preconfigured value; and
  Setting a PBS value to be equal to the CBS value;
if the FC CMD is "SLOW":
  Setting a CIR value to be equal to a preconfigured value;
  Setting a PIR value to be equal to the CIR value;
  Setting a CBS value to be equal to a preconfigured value; and
  Setting a PBS value to be equal to the CBS value;
if the FC CMD is "SLOW SHARP":
  Setting a CIR value to be equal to a preconfigured value;
  Setting a PIR value to be equal to the CIR value;
  Setting a CBS value to be equal to a minimal value thereof;
  Setting a PBS value to be equal to the CBS value;
if the FC CMD is "PAUSE":
  Setting the values of CIR, PIR, CBS, and PBS to be equal to 0.

By another embodiment,

By another embodiment, in case an FC CMD has changed from "SLOW" or "SLOW SHARP" or "PAUSE" to "START", setting an initial fill level of accumulated tokens of a PIR bucket to one maximum packet size (MTU), thus providing immediate ability to use all excess bandwidth on the fabric port, without waiting for tokens to accumulate;

in case an FC CMD has changed from "START" to "SLOW", setting the initial fill level of accumulated tokens of the PIR bucket to the current fill level of a CIR bucket, thus wiping out any excess tokens above the CBS value.

According to another aspect there is provided a packet switch incorporating a Switching Fabric SF, a plurality of input Line cards (Sources), a Flow Control system; and wherein the switch being adapted to implement the various embodiments of the method described above, i.e. to differentially control at least two types of traffic based on more than two levels of congestion.

Thus, there is provided a packet switch operative to manage congestion of traffic associated with at least two different priorities, one being a Low priority traffic "L" and another being a High priority traffic "H", and wherein the packet switch is adapted to:

predetermine more than two different congestion levels at the switch for handling said traffic, for each traffic flow having a specific Destination and Priority (Dest-Prio), determining a current congestion level that matches a congestion control level selected from among said more than two a congestion control levels, and associating a different set of operations for handling each respective traffic flow, depending on its priority and its current congestion level, and for each traffic flow, performing operations that match the respective associated set of operations, and wherein a rate at which said operations are performed for each respective traffic flow increases when a higher congestion level is associated with that respective traffic flow.

In accordance with another embodiment of this aspect, the packet switch comprises:
  a switching fabric SF:
  a plurality of ingress ports (sources) and a plurality of egress ports;
  a packet switching block;
  two fabric pools, one of which for buffering packets of High priority traffic (H buffer pool) and another for buffering packets of Low priority traffic (L buffer pool);
  two fabric Virtual output Queues VoQ for two Dest-Prio traffic flows per each egress fabric port, one fabric VoQ is a HVoQ for queuing packets of High priority traffic and another fabric VoQ is a LVoQ for queuing packets of Low priority traffic,
  a Fabric Flow Control block (FFC) operative to obtain information from the two fabric pools and from all HVoQs and LVoQs of all egress ports, to process the information obtained, to determine current congestion level per Dest-Prio traffic flow based on the information processed, and to provide Flow Control commands (FC) to each of the plurality of sources that match current congestion levels determined,
  a plurality of sources, wherein each specific source comprises a source of High priority traffic VoQ (HVoQ) and a source of Low priority traffic VoQ (LVoQ) per egress port, associated with two respective Dest-Prio traffic flows of a specific egress port to which traffic from said specific source can be switched by the packet switching block;
  a Source Flow Control block (SFC) adapted to communicate with the FFC, operative to receive Flow Control commands (FC) from the FFC, processing the FC received and in each of said specific source, controlling said HVoQs and LVoQs depending on the current congestion level of the corresponding Dest-Prio traffic flow;

thereby allowing the packet switch to exercise differential control of at least HVoQs and LVoQs at the sources, depending on current congestion level of their respective Dest-Prio traffic flows at the egress ports, wherein the current congestion level for a Dest-Prio traffic flow is defined by a combination of at least two conditions, a first condition being a congestion condition of the H buffer pool/L buffer pool, and the second condition being a congestion condition of H fabric VoQ/L fabric VoQ of the specific egress port.

The Flow control system is distributed between the SF and the Sources, for example as follows: the FC at the switch fabric broadcasts status messages (FIG. 5B), and each source using the FC, processes the messages and generates one or more actions for regulating the traffic flows through the switch. (FIGS. 6B and 7B)

According to yet another aspect of the invention there is also provided a computer program product encoding a computer program stored on a non-transitory computer readable storage medium for executing a set of instructions by a computer system comprising one or more computer processors for carrying out embodiments of the method described above.

BRIEF DESCRIPTION OF THE DRAWINGS

A better understanding of the present invention is obtained when the following non-limiting detailed description and examples are considered in conjunction with the accompanying drawings wherein.

DETAILED DESCRIPTION

In the following description, for the purposes of explanation, numerous specific details are set forth in order to provide a thorough understanding of the present invention. It should be apparent, however, that the present invention may be practiced without these specific details.

Figure 4:
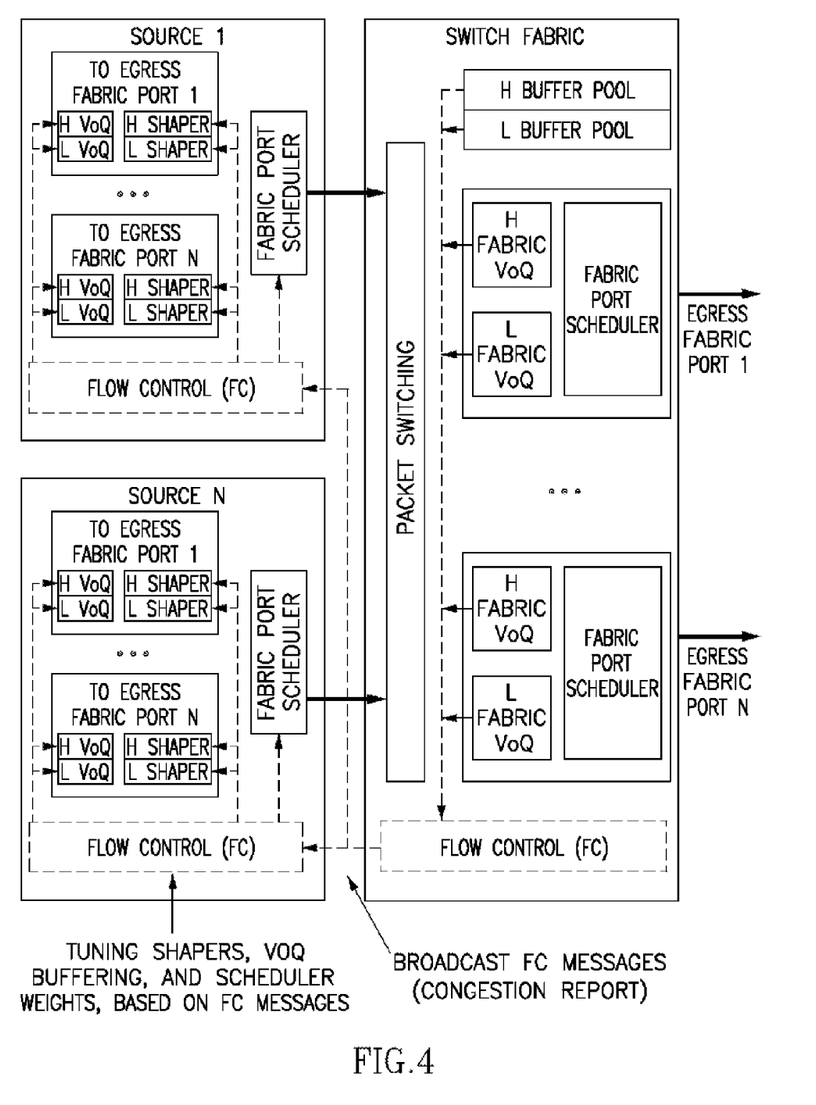
FIG. 4 is a simplified block diagram of one embodiment of the proposed congestion control system in a packet switch.

FIG. 4 illustrates the block diagram of a congestion control system according to an embodiment of the invention. This block diagram is composed of a switch fabric with N fabric ports and N sources.

Each source consists of a fabric port scheduler, and N sets of H VoQ, H Shaper, L VoQ, and L Shaper. A source further includes a flow control (FC) block that receives and processes FC messages broadcasted by the switch fabric.

The switch fabric consists of: (1) Packet switching block that forwards packets to the egress fabric ports (2) TM components that include fabric VoQs, fabric pools, and a fabric scheduler. Each H (L) fabric VoQ has a corresponding H (L) VoQ respectively at each source (3) Flow control (FC) block that collects congestion indications from the fabric pools and the fabric VoQs, and broadcasts FC msgs to the sources, which would trigger appropriate actions there.

Figure 5A:
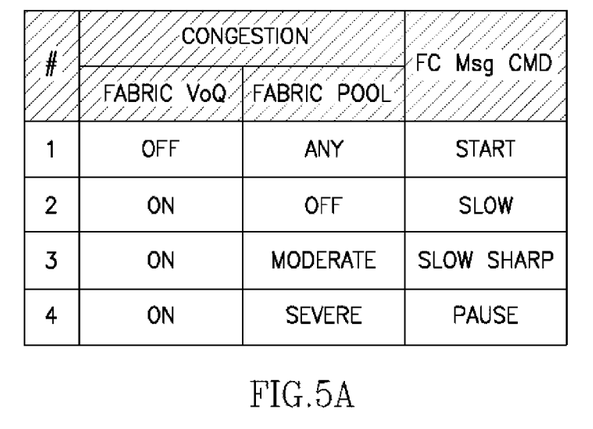
FIG. 5A is a schematic table illustrating the proposed criteria for identifying one out of four levels (1, 2, 3, 4) of congestion per a specific Dest-Prio, and four corresponding Flow Control commands which are to be issued upon identifying the current one of the four levels for a specific Dest-Prio.

FIG. 5A is an exemplary table showing criteria for defining a congestion level and CMDs (Control Commands) of flow control, corresponding to the congestion levels. A fabric VoQ congestion is detected when its current length (i.e., buffer occupied by packets) exceeds a predefined threshold. A fabric pool under moderate (severe) congestion is detected when its current occupation exceeds a predefined X (Y) threshold, respectively, where X<Y; that is, a severe pool congestion is indicated by higher occupation than a moderate one.

In FIG. 5A, the generic FC Message commands (CMDs) to the ingress line card VoQ/shaper set, as function of switch fabric congestion are as follows:

(1) When a fabric VoQ is not congested, the FC msg would indicate a START CMD for the corresponding (source) VoQs.
(2) When a fabric VoQ is congested AND the corresponding fabric pool is not, the FC msg would indicate a SLOW CMD.
(3) When a fabric VoQ is congested AND the corresponding fabric pool has moderate congestion, the FC msg would indicate a SLOW SHARP CMD. This command is also assumed upon initialization, namely, reset, boot, or loss of communication with the switch fabric (no FC msgs).
(4) When a fabric VoQ is congested AND the corresponding fabric pool has severe congestion, the FC msg would indicate a PAUSE CMD.

Figure 5B:
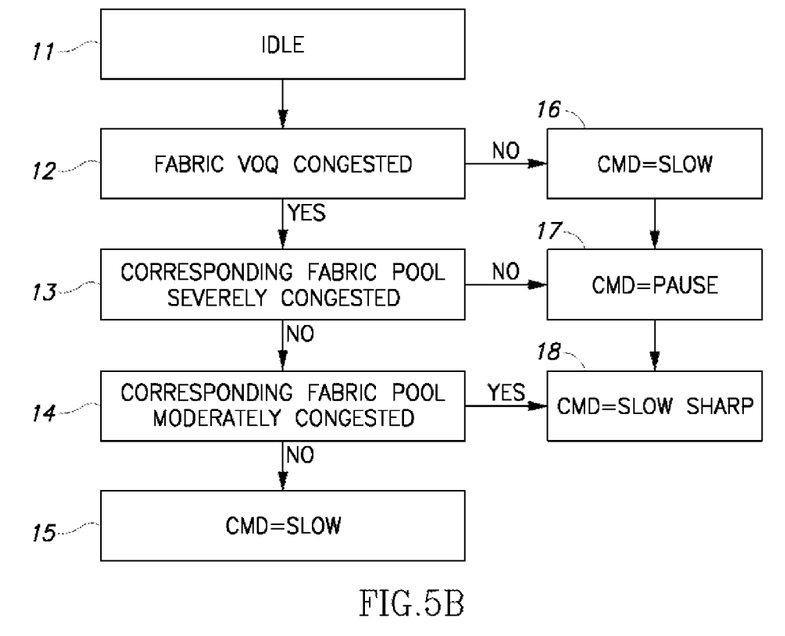
FIG. 5B is a schematic flow chart of identifying a specific congestion control level taking place per fabric VoQ at the switch fabric, and generating the suitable Flow Control (FC) commands.

FIG. 5B demonstrates the congestion control flowchart per fabric VoQ at the switch fabric. Initially (block 1), the fabric VoQ is at Idle state. Then, it is checked whether the fabric VoQ is congested (block 2). In the negative, the associated congestion control command (CMD) is START (block 6). Otherwise, it is checked whether the fabric pool is congested too. If the fabric pool is severely congested (block 3), the CMD is PAUSE (block 7). Else, if it is moderately congested (block 4), the associated CMD is SLOW SHARP (block 8). Else, the fabric pool is not congested and the CMD is set to SLOW (block 5).

Figure 6A:
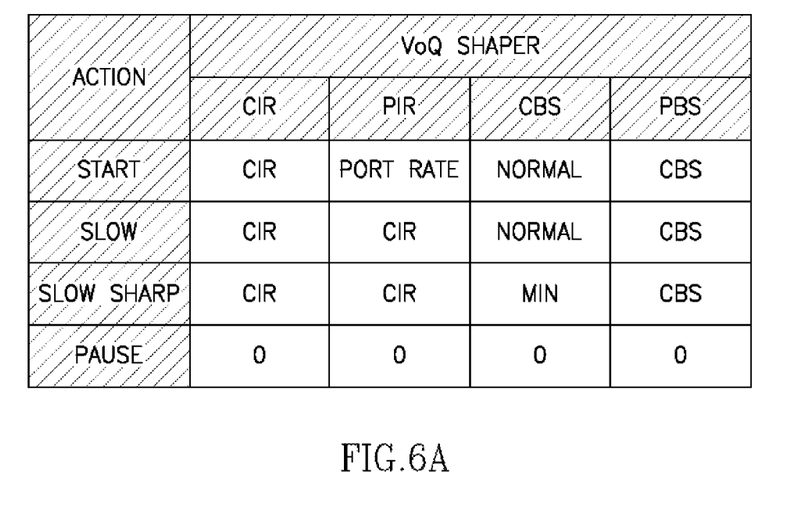
FIG. 6A is a table of actions to be taken at a traffic shaper of a specific virtual queue for Low priority traffic at a source L VoQ shaper, per FC Message/command.

FIG. 6A lists exemplary actions which may be taken at source L VoQ shaper, per FC Msg command:
(1) "START" CMD ("no congestion"):
  Set CIR to the committed value. The CIR of a VoQ could typically be the sum of the guaranteed rates of the service VoQs that it connects.
  Set PIR to the fabric port rate. This allows the VoQ to use all the excess BW on the fabric port.
  Set CBS to the committed ("normal", preconfigured) value. A typical CBS would be several milliseconds or tens of milliseconds at CIR rate, but no less than one maximum packet size (MTU).

Set PBS to CBS. This prevents bursts above the committed value (though it is not significant here, because PIR=Port Rate).

In addition, if CMD changed from SLOW/SLOW SHARP/PAUSE to START, set the initial fill level (accumulated tokens) of the PIR bucket to one maximum packet size (MTU). This rule provides immediate ability to use all the excess BW on the fabric port, without waiting for tokens to accumulate.

(2) "SLOW" CMD ("minor congestion"):

Set CIR to the committed (preconfigured, "normal") value.

Set PIR to CIR. This is the first step taken to reduce congestion, now permitting only committed traffic to be sent.

Set CBS to the committed (preconfigured, "normal") value.

Set PBS to CBS.

In addition, if CMD changed from START to SLOW, set the initial fill level (accumulated tokens) of the PIR bucket to the current fill level of the CIR bucket. This rule wipes out any excess tokens above the CBS.

(3) "SLOW SHARP" CMD ("moderate congestion" or initialization):

Set CIR to the committed (preconfigured) value.

Set PIR to CIR. This precaution was applied already at SLOW CMD.

Set CBS to the minimal value. The Min CBS value could be configurable by the management system. This is the second step taken to reduce congestion, now permitting to send guaranteed traffic, however without any burstiness. The minimal value would typically be one maximum packet size (MTU). Such minimal burstiness does not require much buffering, and well suits switch fabrics with small packet memory. It should be noted that a SLOW SHARP CMD could degrade the committed burst size (CBS), since it reduces the burstiness below the committed value. Yet, owing to their large memory, the sources could absorb L traffic bursts, thus avoiding L priority discards and CBS violation.

Set PBS to CBS.

(4) "PAUSE" ("severe congestion"): Given the strict priority of H over L priority at the switch fabric scheduler (FIG. 3), the L traffic might be accumulated too much at the switch fabric, e.g., due to high bursts of H traffic. When this happens, it is best to stop the sources and keep the L traffic at them, where there is much larger memory than at the switch fabric. Note that a PAUSE CMD could result with CIR violation to L priority traffic, since the sources are forced to stop the associated traffic. This scenario is less likely when H traffic is not bursty and its CIR is relatively small (e.g., compared to L traffic CIR), and could be regarded as "abnormal".

Set CIR, PIR, CBS, and PBS to 0.

Figure 6B:
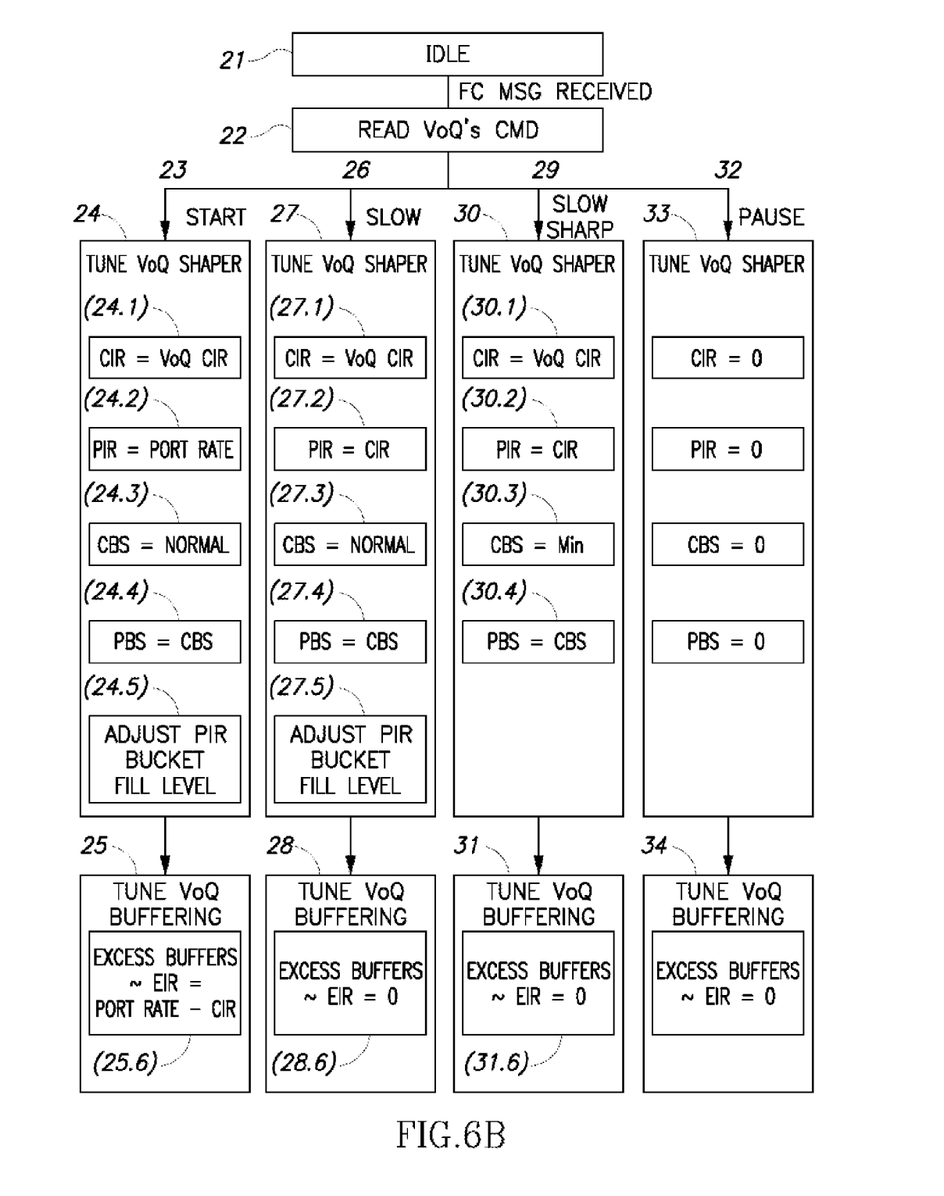
FIG. 6B is a schematic flow chart of the congestion control actions of FIG. 6A, taking place per Low priority VoQ at a source.

FIG. 6B illustrates the congestion control flowchart per L VoQ at the source line card. Initially (block 1), the VoQ is at Idle state. When an FC msg is received (block 2), the associated CMD is checked, and actions are taken accordingly as described next:

CMD=START (block 3): the VoQ shaper (block 4) is tuned as follows: (1) CIR is set to the preconfigured (e.g., as configured previously by a management system) CIR (2) PIR is set to the port rate (3) CBS is set to the preconfigured (e.g., as configured previously management system) normal value (4) PBS is set equal to CBS (5) if CMD changed from SLOW/SLOW SHARP/PAUSE to START, adjust the PIR bucket fill level (accumulated tokens) by setting it to one maximum packet size (MTU). This rule provides immediate ability to use all the excess BW on the fabric port, without waiting for tokens to accumulate (6) The VoQ's excess buffering (block 5) is set proportional to the EIR (i.e., to PIR minus CIR).

CMD=SLOW (block 6): the VoQ shaper (block 7) is tuned as follows: (1) CIR is set to the preconfigured CIR (2) PIR is set equal to CIR (3) CBS is set to the preconfigured committed value (4) PBS is set equal to CBS (5) If CMD changed from START to SLOW, adjust the PIR bucket fill level (accumulated tokens) by setting it to the current fill level of the CIR bucket. This rule wipes out any excess tokens above the CBS (6) The VoQ's excess buffering (block 8) is set proportional to the EIR, that is, zero.

CMD=SLOW SHARP (block 9): the VoQ shaper (block 10) is tuned as follows: (1) CIR is set to the preconfigured CIR (2) PIR is set equal to CIR (3) CBS is set to a preconfigured minimum value (e.g., to max packet size) (4) PBS is set equal to CBS (5) The VoQ's excess buffering (block 11) is set proportional to the EIR, that is, zero.

CMD=PAUSE (block 12): the VoQ shaper (block 13) is tuned to zero values, thereby blocking any traffic. Additionally, the VoQ's excess buffering (block 14) is set proportional to the EIR, that is, zero.

Figure 6C:
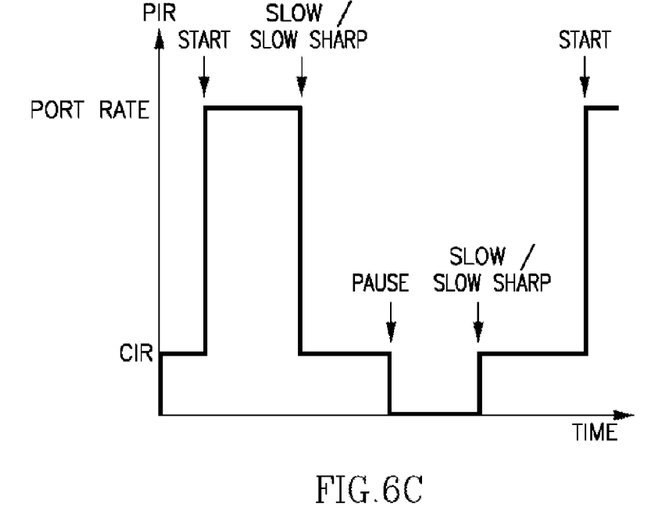
FIG. 6C schematically shows L VoQ Shaper's Peak information rate (PIR) under the FC commands referred to in FIGS. 6A, 6B.

FIG. 6C illustrates the L VoQ shaper PIR, as function of time:

(1) "START" CMD: PIR=Port Rate
(2) "SLOW" CMD ("minor congestion"): PIR=CIR
(3) "SLOW SHARP" CMD ("moderate congestion"): PIR=CIR
(4) "PAUSE" ("severe congestion"): PIR=0

Other accompanying actions at source, per FC Msg command include:

(1) VoQ buffering may be tuned according to the new shaper values. For example, when EIR=PIR-CIR is reduced, the excess portion of the VoQ buffering may be reduced proportionally. Note that except for the "abnormal" PAUSE command, the VoQ's CIR does not change by FC messages, and hence VoQ guaranteed buffering (set according to CIR) would not change.

Figure 7A:
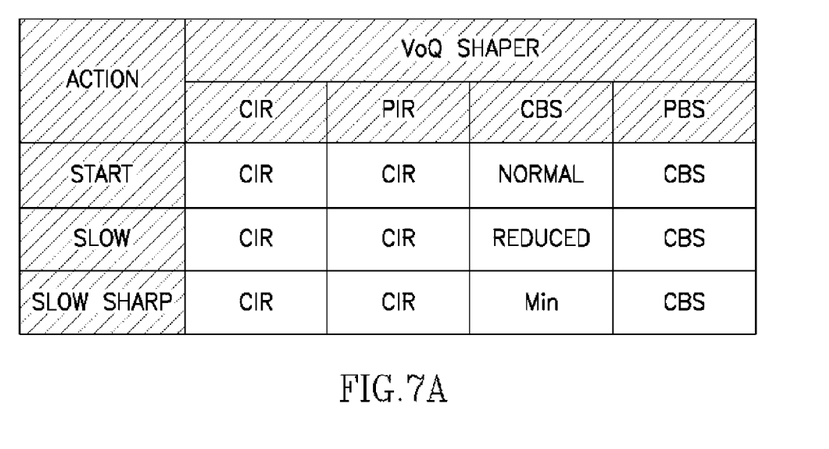
FIG. 7A is a table of actions to be taken at a traffic shaper of a specific virtual queue for High priority traffic at a source H VoQ shaper, per FC Message/command.

FIG. 7A lists exemplary actions to take at source H VoQ shaper, per FC Msg command:

(1) "START" CMD ("no congestion"):

Set CIR to the committed (preconfigured, normal) value.

Set PIR to CIR. H priority traffic is typically not expected to use excess rate, or else it could starve L priority traffic due to its strict priority at the fabric scheduler (FIG. 3).

Set CBS to the committed ("normal") value. A typical CBS would be less than that of L VoQ.

Set PBS to CBS. H priority traffic is typically not expected to have excess bursts.

(2) SLOW CMD ("minor congestion"):

Set CIR to the committed value.

Set PIR to CIR.

Set CBS to a reduced value. This is the first step taken to reduce congestion, now permitting only smaller burstiness (e.g., by order of magnitude). The reduced burstiness requires much less buffering, and then can well be accommodated by switch fabrics.

Set PBS to CBS.

(3) SLOW SHARP CMD ("moderate congestion" or initialization):

Set CIR to the committed, preconfigured value.

Set PIR to CIR.

Set CBS to the minimal value. This is the second step taken to reduce congestion, now permitting only guaranteed traffic without any burstiness to be sent. The minimal value would typically be one maximum packet size (MTU).

Set PBS to CBS.

(4) PAUSE ("severe congestion"): A proper design of H pool thresholds, and specifically the buffer space between the moderate and severe thresholds, and a strict priority of H over L traffic at the switch fabric outgoing fabric port, would make this CMD unlikely.

Figure 7B:
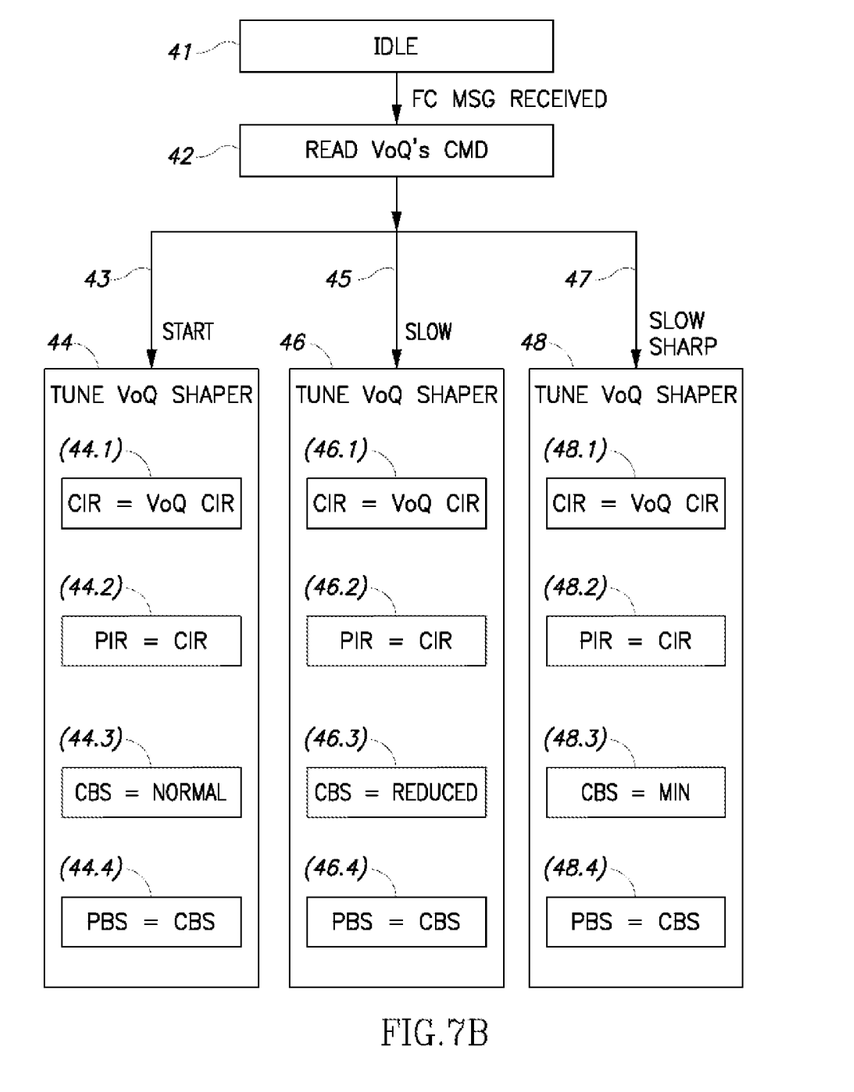
FIG. 7B is a schematic flow chart of the congestion control actions of FIG. 7A, taking place per High priority VoQ at a source.

FIG. 7B illustrates a congestion control flowchart per H VoQ at the source line card. Initially (block 1), the VoQ is at Idle state. When an FC msg is received (block 2), the associated CMD is checked, and actions are taken accordingly as described in the following:

CMD=START (block 3): the VoQ shaper (block 4) is tuned as follows: (1) CIR is set to the preconfigured (e.g., as configured previously management system) CIR (2) PIR is set to CIR, as it assumed that H priority traffic do not need excess rate (3) CBS is set to the preconfigured (e.g., as configured previously by a management system) normal value (4) PBS is set equal to CBS.

CMD=SLOW (block 6): the VoQ shaper (block 6) is tuned as follows: (1) CIR is set to the preconfigured CIR (2) PIR is set equal to CIR (3) CBS is set to a preconfigured reduced value (4) PBS is set equal to CBS.

CMD=SLOW SHARP (block 9): the VoQ shaper (block 8) is tuned as follows: (1) CIR is set to the preconfigured CIR (2) PIR is set equal to CIR (3) CBS is set to a preconfigured minimum value (e.g., to max packet size) (4) PBS is set equal to CBS.

Since it is assumed that H priority traffic does not need excess rate, the VoQ excess buffering is set fixed to be equal to zero.

Figure 7C:
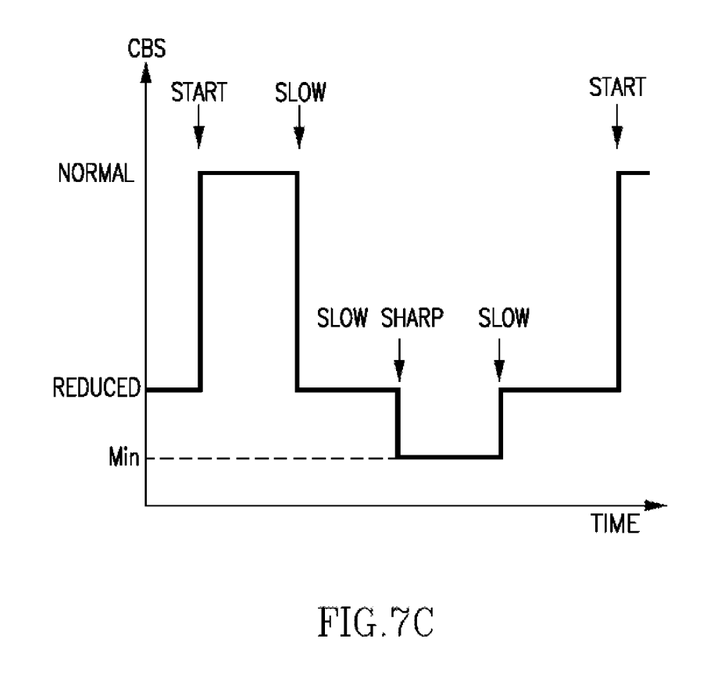
FIG. 7C schematically shows H VoQ Shaper's Committed Burst Size ("CBS") under the FC commands referred to in FIGS. 7A, 7B.

FIG. 7C illustrates the H VoQ shaper CBS, as function of time:

(1) "START" CMD: CBS=Normal vale (2) "SLOW" CMD ("minor congestion"): CBS=Reduced value (3) "SLOW SHARP" CMD ("moderate congestion"): CBS=Min value The normal, reduced and minimal CBS values for each of the traffic priority types (H, L) are defined by a management system when configuring the switch. The value of CBS is regulated by controlling the shaper (i.e., the shaper implements the CBS).

Meeting the Objectives Owing to the Proposed Method:

(1) Lossless Operation: It is possible to prevent discards at the switch fabric. When there is a congestion condition at the switch fabric, the sources are throttled and reduce the traffic rate at incremental steps, up to a complete pause. Correct timing calculations based on hardware capabilities, e.g., response time once a new congestion level is asserted till sources would actually reduce traffic rate, can avoid buffer over-runs and consequent discards at the switch fabric.

(2) Full Utilization: The switch fabric is able to fully utilize its capacity. When congestion decreases, the sources increase traffic rates at incremental steps, up to full rate. Correct timing calculations based on hardware capabilities, e.g., response time once congestion level is reduced till sources actually increase the rate of the outgoing traffic, thereby avoiding buffer under-runs and consequent under-utilization at the switch fabric.

(3) QoS: The system can provide guaranteed BW per service. This would be achieved given that the switch fabric is lossless and can be fully utilized, thereby any source VoQ can send at least its CIR rate, and consequently the CIR of Service VoQ scheduled by the corresponding Service Scheduler (FIG. 2).

(4) Simplicity: The solution could run with small sized memory switch fabrics, including those based on off-the-shelf packet processors, providing that they are enhanced with congestion control indications per egress port, which is often the case. This is achieved by relaying congestion condition to the sources, which reduce and absorb traffic accordingly.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Also, the present invention describes traffic control operations in a packets' switch using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. Also, it should be appreciated by those skilled in the art that other/additional traffic control operations may be included within the scope of the present invention. Thus, the scope of the invention is limited only by the following claims.

The invention claimed is:

1. A method for managing congestion of traffic in a packet switch, comprising the steps of:

providing more than two different congestion levels at the switch for handling traffic associated with at least two different priorities, one being a Low priority traffic "L" and another being a High priority traffic "H";

for each traffic flow having a specific Destination and Priority (Dest-Prio), determining a current congestion level that matches a congestion control level selected from among said more than two a congestion control levels, and associating a different set of operations for handling each respective traffic flow, depending on its priority and its current congestion level, and for each traffic flow, performing operations that match the respective associated set of operations, and wherein a rate at which said operations are performed for each respective traffic flow increases when a higher congestion level is associated with that respective traffic flow, and wherein the more than two different congestion levels comprising:

level 1, "Not congested", wherein a fabric VoQ is not congested and irrespective whether a fabric pool is congested or not, wherein said level 1 is associated with an FC CMD "START" to enable unlimited rate of transmission from a source VoQ;

level 2, "Slightly congested", wherein the fabric VoQ is congested, whereas the fabric pool is not congested, wherein said level 2 is associated with an FC CMD "SLOW" for reducing rate of transmission from the source VoQ;

level 3, "Moderately congested", wherein the fabric VoQ is congested and the fabric pool is moderately congested, wherein said level 3 is associated with an FC CMD "SLOW SHARP" for sharply reducing rate of transmission from the source VoQ;

level 4, "Severely congested", wherein the fabric VoQ is congested and the fabric pool is severely congested, wherein said level 4 is associated with an FC CMD "PAUSE" to stop transmissions from the source VoQ, and wherein said levels of traffic flows congestions are used in generating respective Flow Control commands (FC CMDs) for regulating one or more traffic flows at a source of each given traffic flow.

2. The method according to claim 1, further comprising providing each virtual queue HVoQ/LVoQ located at each specific Source with a corresponding HShaper/LShaper and blocks for scheduling and buffering, controlled by Source Flow Control (SFC) for regulating traffic transmission rate from virtual queues at a specific source.

3. The method according to claim 2, providing for each combination of a specific command from among the FC CMDs and a specific priority from said at least two different priorities, a set of traffic control operations, for controlling a corresponding source shaper, scheduling parameters and buffering, wherein the traffic control operations rely on a value of at least one parameter from the group that comprises:
Committed information rate CIR, a guaranteed rate per Dest-Prio;
Peak information rate PIR, a maximum allowed rate per Dest-Prio;
Committed burst size CBS, a guaranteed burstiness; and
Peak burst rate PBS, a maximum allowed burstiness.

4. The method according to claim 3, wherein said set of the traffic control operations comprises performing, upon receiving an FC CMD, the following operations at a source H VoQ shaper:
if the FC CMD is "START"—tuning the VoQ shaper so that CIR value is set to be equal to a preconfigured CIR value, setting a PIR value to be equal to the CIR value, setting CBS value to a preconfigured committed value and setting PBS value to be equal to the CBS value 1;
if the FC CMD is "SLOW"—tuning the VoQ shaper so that CIR value is set to be equal to a preconfigured CIR value, setting a PIR value to be equal to the CIR value, setting CBS value to be equal to a preconfigured reduced value, and setting a PBS value to be equal to the CBS value;
if the FC CMD is "SLOW SHARP"—tuning the VoQ shaper so that CIR value is set to a preconfigured CIR value, setting a PIR value to be equal to the CIR value, setting a CBS value to be equal to a preconfigured minimum value, and setting a PBS value to be equal to the CBS value.

5. The method according to claim 3, wherein said set of the traffic control operations comprises performing, upon receiving an FC CMD, the following operations at a source L VoQ shaper:
if the FC CMD is "START":
Setting a CIR value to be equal to a preconfigured value;
Setting a PIR value to be equal to the fabric port rate;
Setting a CBS value to be equal to a preconfigured value; and
Setting a PBS value to be equal to the CBS value;
if the FC CMD is "SLOW":
Setting a CIR value to be equal to a preconfigured value;
Setting a PIR value to be equal to the CIR value;
Setting a CBS value to be equal to a preconfigured value; and
Setting a PBS value to be equal to the CBS value;
if the FC CMD is "SLOW SHARP":
Setting a CIR value to be equal to a preconfigured value;
Setting a PIR value to be equal to the CIR value;
Setting a CBS value to be equal to a minimal value thereof;
Setting a PBS value to be equal to the CBS value;
if the FC CMD is "PAUSE":
Setting the values of CIR, PIR, CBS, and PBS to be equal to 0.

6. The method according to claim 1 wherein
in case an FC CMD has changed from "SLOW" or "SLOW SHARP" or "PAUSE" to "START", setting an initial fill level of accumulated tokens of a PIR bucket to one maximum packet size (MTU), thus providing immediate ability to use all excess bandwidth on the fabric port, without waiting for tokens to accumulate;
in case an FC CMD has changed from "START" to "SLOW", setting the initial fill level of accumulated tokens of the PIR bucket to the current fill level of a CIR bucket, thus wiping out any excess tokens above the CBS value.

7. A packet switch, comprising:
a switching fabric SF;
a plurality of ingress ports (sources) and a plurality of egress ports;
a packet switching block;
two fabric pools, one of which for buffering packets of High priority traffic (H buffer pool) and another for buffering packets of Low priority traffic (L buffer pool);
two fabric Virtual output Queues VoQ for two Dest-Prio traffic flows per each egress fabric port, one fabric VoQ is a HVoQ for queuing packets of High priority traffic and another fabric VoQ is a LVoQ for queuing packets of Low priority traffic,
a Fabric Flow Control block (FFC) operative to obtain information from the two fabric pools and from all HVoQs and LVoQs of all egress ports, to process the information obtained, to determine current congestion level per Dest-Prio traffic flow based on the information processed, and to provide Flow Control commands (FC) to each of the plurality of sources that match current congestion levels determined,
a plurality of sources, wherein each specific source comprises a source of High priority traffic VoQ (HVoQ) and a source of Low priority traffic VoQ (LVoQ) per egress port, associated with two respective Dest-Prio traffic flows of a specific egress port to which traffic from said specific source can be switched by the packet switching block;
a Source Flow Control block (SFC) adapted to communicate with the FFC, the SFC is configured to:
determine a current congestion level that matches a congestion control level selected from among more than two predetermined congestion control levels;
receive Flow Control commands (FC) from the FFC, wherein the FC commands is associated with a set of operations for handling each respective traffic flow, depending on its priority and its current congestion level;
process the FC commands received and perform operations that match the respective associated set of operations, and wherein a rate at which said operations are performed for each respective traffic flow increases when a higher congestion level is associated with that respective traffic flow;

control said HVoQs and LVoQs depending on the current congestion level of the corresponding Dest-Prio traffic flow;

thereby allowing the packet switch to exercise differential control of at least HVoQs and LVoQs at the sources, depending on current congestion level of their respective Dest-Prio traffic flows at the egress ports, wherein the current congestion level for a Dest-Prio traffic flow is defined by a combination of at least two conditions, a first condition being a congestion condition of the H buffer pool/L buffer pool, and the second condition being a congestion condition of H fabric VoQ/L fabric VoQ of the specific egress port.

* * * * *